(No Model.)

T. C. SWOFFORD.
NUT LOCK.

No. 524,004. Patented Aug. 7, 1894.

Witnesses
B. S. Ober
N. T. Riley

Inventor
Thomas C. Swofford,
By his Attorneys,
C. A. Snow & Co.

UNITED STATES PATENT OFFICE.

THOMAS C. SWOFFORD, OF FORDYCE, ARKANSAS.

NUT-LOCK.

SPECIFICATION forming part of Letters Patent No. 524,004, dated August 7, 1894.

Application filed May 18, 1894. Serial No. 511,688. (No model.)

*To all whom it may concern:*

Be it known that I, THOMAS C. SWOFFORD, a citizen of the United States, residing at Fordyce, in the county of Dallas and State of Arkansas, have invented a new and useful Nut-Lock, of which the following is a specification.

The invention relates to improvements in nut locks.

The object of the present invention is to improve the construction of nut locks, and to provide a simple and inexpensive one, designed to be employed on rail joints, and the like, and adapted to enable a nut to be readily screwed on the bolt, and capable of effectually preventing the nut from accidentally unscrewing, and of enabling the nut to be readily removed when desired without impairing the future usefulness of the nut lock.

The invention consists in the construction and novel combination and arrangement of parts hereinafter fully described, illustrated in the accompanying drawings, and pointed out in the claims hereto appended.

Figure 1:
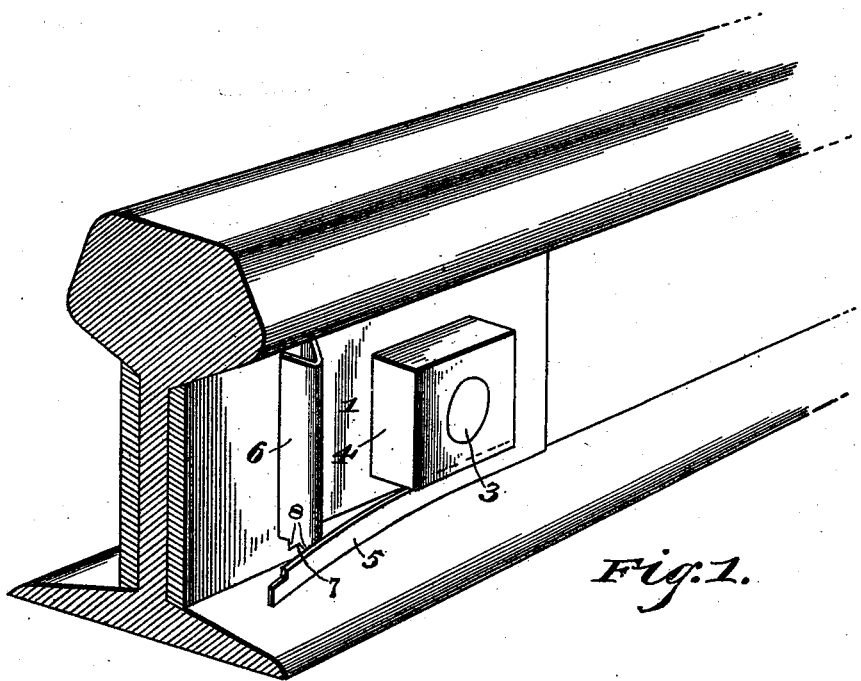
Figure 2:
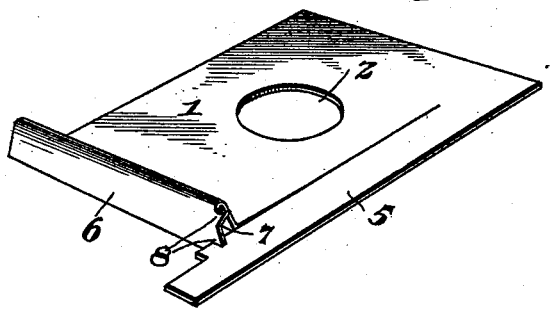
Figure 3:
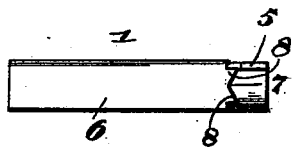

In the drawings—Figure 1 is a perspective view of a nut lock constructed in accordance with this invention, and shown applied to a bolt and nut. Fig. 2 is a perspective view of the nut lock detached. Fig. 3 is an end elevation of the same.

Like numerals of reference indicate corresponding parts in all the figures of the drawings.

1 designates a locking plate, having a bolt opening 2, and designed to be arranged on a bolt 3 beneath a nut 4, and provided with an integral locking spring 5 formed by slitting the plate longitudinally at one side thereof. The spring is adapted to lie at an angle to the plate to enable a nut in being screwed on the bolt to depress and pass it, and it is adapted to have its inner edge engaged by the nut to prevent any unscrewing.

In order to increase the effectiveness of the spring, and also to enable the latter to be readily maintained in a depressed position to facilitate rapid unscrewing of the nut without interference on the part of the spring, the locking plate is provided with an approximately vertical flange 6 formed by bending the plate upward, and then downward as shown. The flange 6 is provided at one end, adjacent to the spring, with a V-shaped or triangular recess 7, forming oppositely beveled portions or teeth 8 and shoulders are provided at the opposite upper and lower ends of the teeth, the lower shoulder being formed by an angular recess at the lower end of the flange. The oppositely disposed beveled and shouldered teeth permit the spring to have free play in the V-shaped recess to operate as before described; the spring is adapted to be engaged with the lower teeth to hold it in a depressed condition; and it is also adapted to be engaged with the upper tooth to lock it in a raised position, to prevent it from becoming depressed accidentally through loss of resiliency, or any other cause.

It will be seen that the nut lock is exceedingly simple and inexpensive in construction, that it is capable of preventing a nut from accidentally unscrewing, and of enabling the same to be readily removed when desired without injuring the nut lock. It will also be apparent that the locking plate may be constructed of a single piece of sheet metal without waste, and that it is adapted to be employed on rail joints and all other places where it is desirable to lock a nut.

Changes in the form, proportion and the minor details of construction may be resorted to without departing from the principle or sacrificing any of the advantages of this invention.

What I claim is—

1. A nut lock, consisting of a locking plate provided with a spring for engaging a nut, and provided with a flange arranged at an angle to the spring, and having adjacent to the same, opposite teeth adapted to be engaged by the spring, whereby the spring is locked in its elevated and depressed positions, substantially as described.

2. A nut lock, constructed of a single piece of sheet metal, and consisting of a plate having at one side a spring, and having one end bent upward and downward to form a flange provided with opposite shouldered teeth having their adjacent edges beveled, said teeth being arranged to be engaged by the spring, whereby the latter is locked in its raised and depressed positions, substantially as described.

In testimony that I claim the foregoing as my own I have hereto affixed my signature in the presence of two witnesses.

THOMAS C. SWOFFORD.

Witnesses:
B. F. ADAMS,
R. M. JORDAN.